(12) United States Patent
Nakamura et al.

(10) Patent No.: US 7,673,920 B2
(45) Date of Patent: Mar. 9, 2010

(54) OPERATOR'S STATION STRUCTURE FOR WORK VEHICLE

(75) Inventors: Norimi Nakamura, Sakai (JP); Koji Nada, Sakai (JP); Shoichiro Kawamura, Hannan (JP); Masaki Hayashi, Sakai (JP); Masaru Nakaji, Sakai (JP); Shinichiro Saji, Sakai (JP); Takeshi Tsuchiya, Sakai (JP)

(73) Assignee: Kubota Corporation, Osaka (JP)

( * ) Notice: Subject to any disclaimer, the term of this patent is extended or adjusted under 35 U.S.C. 154(b) by 59 days.

(21) Appl. No.: 11/726,368

(22) Filed: Mar. 21, 2007

(65) Prior Publication Data

US 2008/0084082 A1    Apr. 10, 2008

(30) Foreign Application Priority Data

Oct. 5, 2006    (JP) .............................. 2006-274001
Oct. 10, 2006    (JP) .............................. 2006-276264

(51) Int. Cl.
*B60N 2/10*    (2006.01)
*B60R 7/04*    (2006.01)

(52) U.S. Cl. ..................... 296/37.15; 224/274; 224/275
(58) Field of Classification Search ................. 224/274, 224/275; 296/37.15
See application file for complete search history.

(56) References Cited

U.S. PATENT DOCUMENTS

| | | | | |
|---|---|---|---|---|
| 1,494,854 A | * | 5/1924 | Luther | 296/37.15 |
| 3,058,771 A | * | 10/1962 | Hill et al. | 296/37.15 |
| 3,800,939 A | * | 4/1974 | Cornelius | 224/275 |
| 4,076,302 A | * | 2/1978 | Sable | 296/65.06 |
| 4,266,707 A | * | 5/1981 | Rossman | 224/275 |
| 4,311,205 A | * | 1/1982 | Goodacre et al. | 180/68.5 |
| 4,863,208 A | * | 9/1989 | Streett | 296/37.15 |
| 5,622,404 A | * | 4/1997 | Menne | 297/188.1 |
| 5,667,115 A | * | 9/1997 | Verhaeg | 224/275 |
| 5,816,650 A | * | 10/1998 | Lucas, Jr. | 297/188.1 |
| 5,902,009 A | * | 5/1999 | Singh et al. | 297/188.1 |
| D428,701 S | * | 8/2000 | Lamo, Jr. | D3/313 |
| 6,106,044 A | * | 8/2000 | Schlachter | 296/37.15 |
| 6,357,820 B1 | * | 3/2002 | Nagatsuka et al. | 296/190.06 |
| 6,386,612 B2 | * | 5/2002 | Hofmann et al. | 296/37.15 |
| 6,419,313 B1 | * | 7/2002 | Newman | 297/188.1 |
| 6,422,641 B1 | * | 7/2002 | Coryell | 296/182.1 |
| 6,488,327 B1 | * | 12/2002 | Pearse et al. | 296/65.05 |
| 6,644,523 B1 | * | 11/2003 | Salas | 224/275 |
| 6,824,029 B2 | * | 11/2004 | Tuel et al. | 224/275 |
| 6,877,807 B2 | * | 4/2005 | Mizuno et al. | 297/188.1 |
| 6,929,306 B2 | * | 8/2005 | Mack et al. | 296/65.09 |
| 7,104,593 B2 | * | 9/2006 | Hungerford et al. | 296/190.02 |

(Continued)

FOREIGN PATENT DOCUMENTS

EP    333267 A1 *    9/1989

(Continued)

*Primary Examiner*—Glenn Dayoan
*Assistant Examiner*—Paul A Chenevert
(74) *Attorney, Agent, or Firm*—The Webb Law Firm

(57) ABSTRACT

An operator's station structure for a work vehicle having a motor section, comprising: a seat that is disposed on the operator's station for a work vehicle and has a moveable seat part; and a removable storage box that is disposed below the seat, that has an upwardly opening shape, and that has an interior accessible by moving the seat part.

8 Claims, 14 Drawing Sheets

U.S. PATENT DOCUMENTS 7,300,088 B1 * 11/2007 Catenacci et al. ........ 296/37.15
7,318,616 B1 * 1/2008 Bradley .................... 296/37.15
2006/0244281 A1 * 11/2006 Cover ...................... 296/37.15

FOREIGN PATENT DOCUMENTS

| | | | |
|---|---|---|---|
| EP | 589188 A1 * | 3/1994 | |
| JP | 60193782 A * | 10/1985 | |
| JP | 05069862 A * | 3/1993 | |
| JP | 2005-178782 | 7/2005 | |
| JP | 2005-0212783 | 8/2005 | |

* cited by examiner

OPERATOR'S STATION STRUCTURE FOR WORK VEHICLE

BACKGROUND OF THE INVENTION

1. Field of the Invention

The present invention relates to an operator's station structure for a work vehicle.

2. Description of the Related Art

In conventional work vehicles, a structure such as that disclosed in JP 2005-212783 is employed in which a plate-metal shielding cover is mounted on a vehicle body frame and a seat is disposed on the shielding cover.

A storage box into which small items are placed is preferably provided to the operator's station. The storage box is generally provided below the seat or on a dashboard at a front part of the operator's station. When the storage box is provided below the seat, a pullout-type storage box can be provided in a structure such as that described above in which the shielding cover is disposed below the seat. However, a slide-guiding structure must be employed so that the storage box can readily be pulled out and pushed in, which increases costs.

SUMMARY OF THE INVENTION

In view of the foregoing points, it is an object of the present invention to make it possible for items to be stored below a seat of an operator's station using an uncomplicated structure.

An operator's station structure according to the present invention for a work vehicle having a motor section, comprises:

- a seat that is disposed on the operator's station for a work vehicle and has a moveable seat part; and
- a removable storage box that is disposed below the seat, that has an upwardly opening shape, and that has an interior accessible by moving the seat part.

DESCRIPTION OF THE PREFERRED EMBODIMENTS

Preferred embodiments of the present invention shall be described below with reference to the accompanying drawings.

Several embodiments shall be described. However, any combinations of a feature disclosed in a certain embodiment and another feature disclosed in another embodiment is considered to fall within the scope of the present invention.

Figure 1:
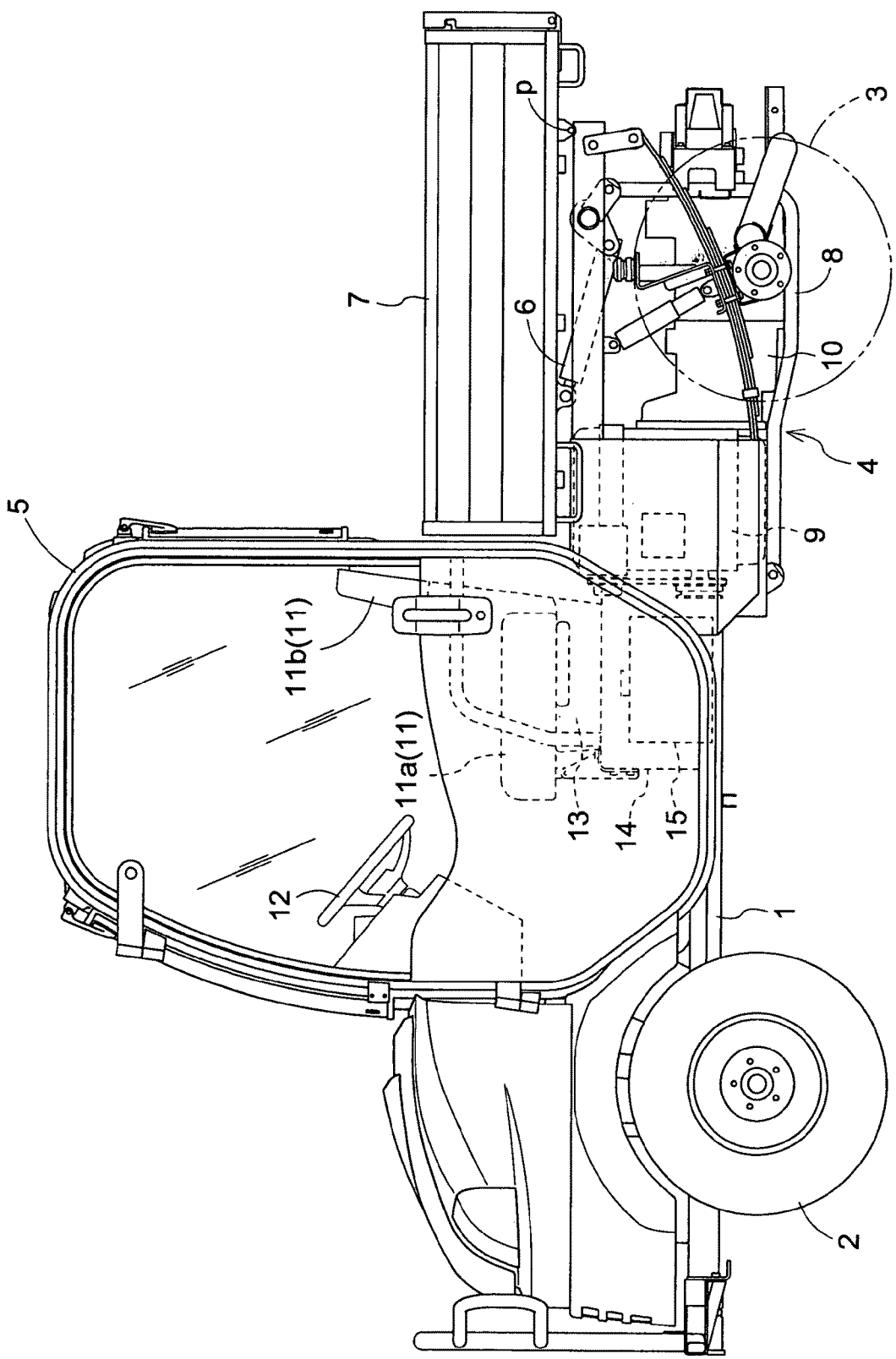
FIG. 1 is a side view of an entire body of a work vehicle.
Figure 2:
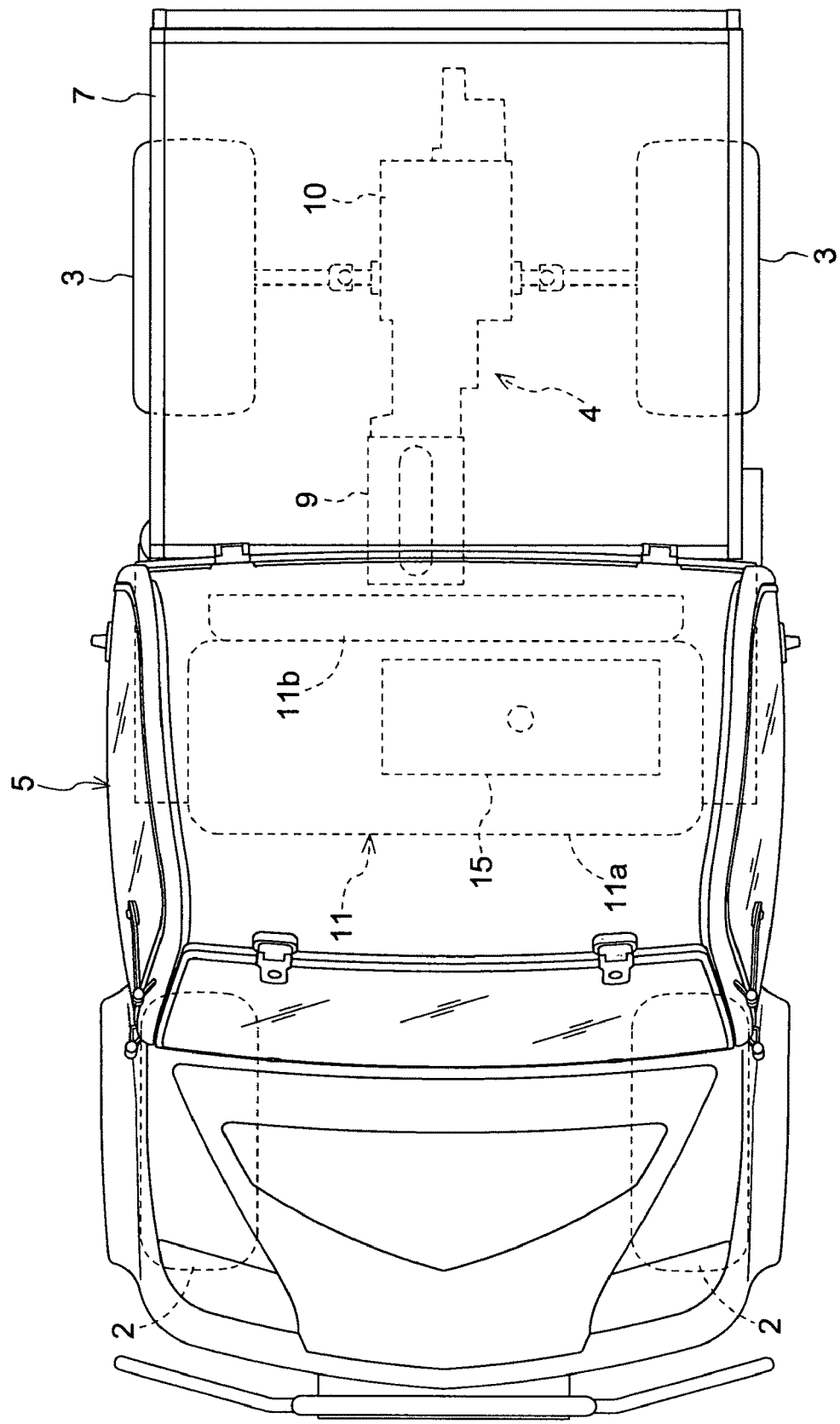
FIG. 2 is a plan view of the entire body of the work vehicle.
Figure 3:
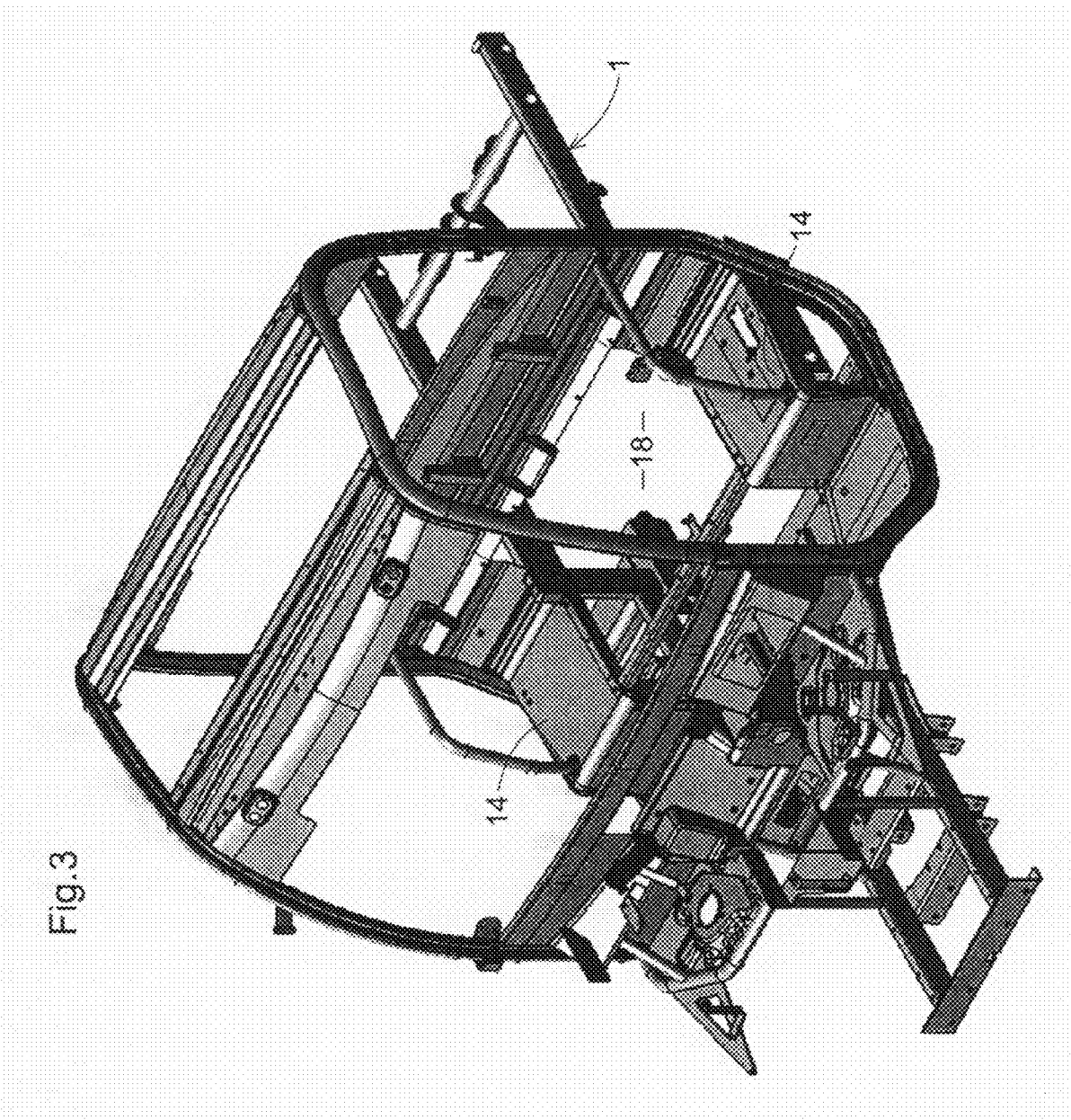
FIG. 3 is a perspective view showing a framework structure of a vehicle body.
Figure 4:
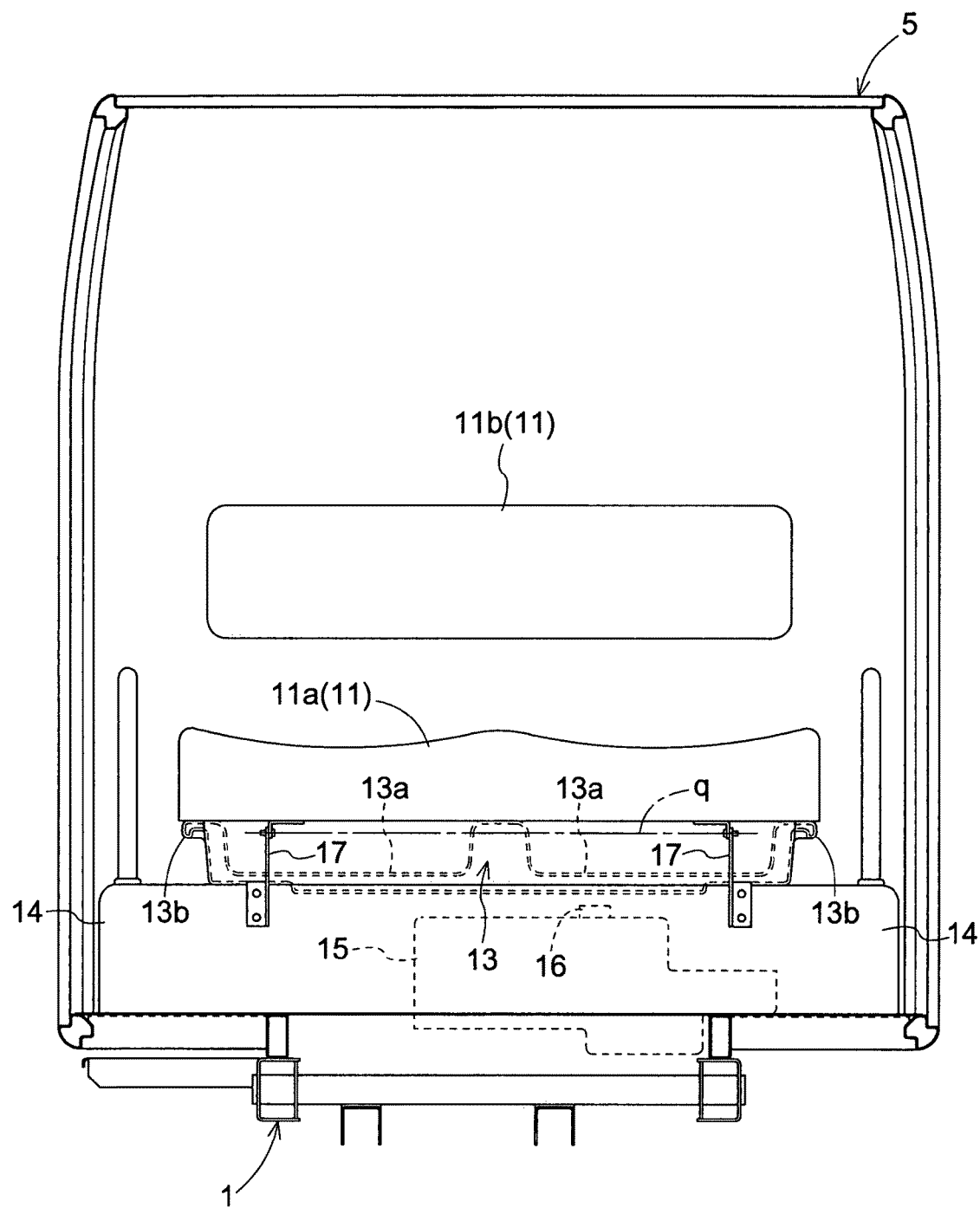
FIG. 4 is a front view showing a support structure for a seat.
Figure 5:
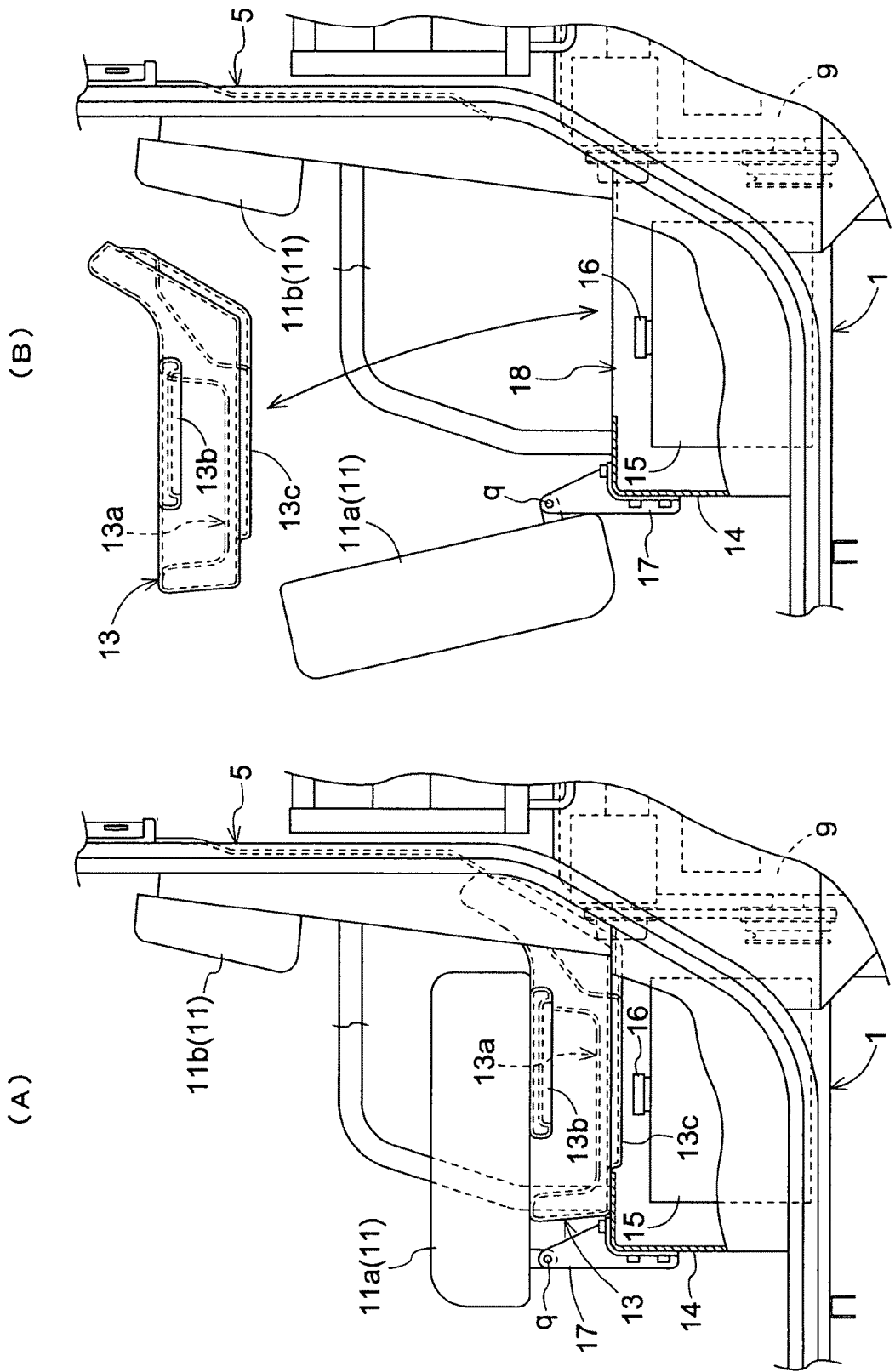
FIGS. 5A and 5B are a side view of a state of use and a side view of an opened state showing the support structure for the seat.
Figure 6:
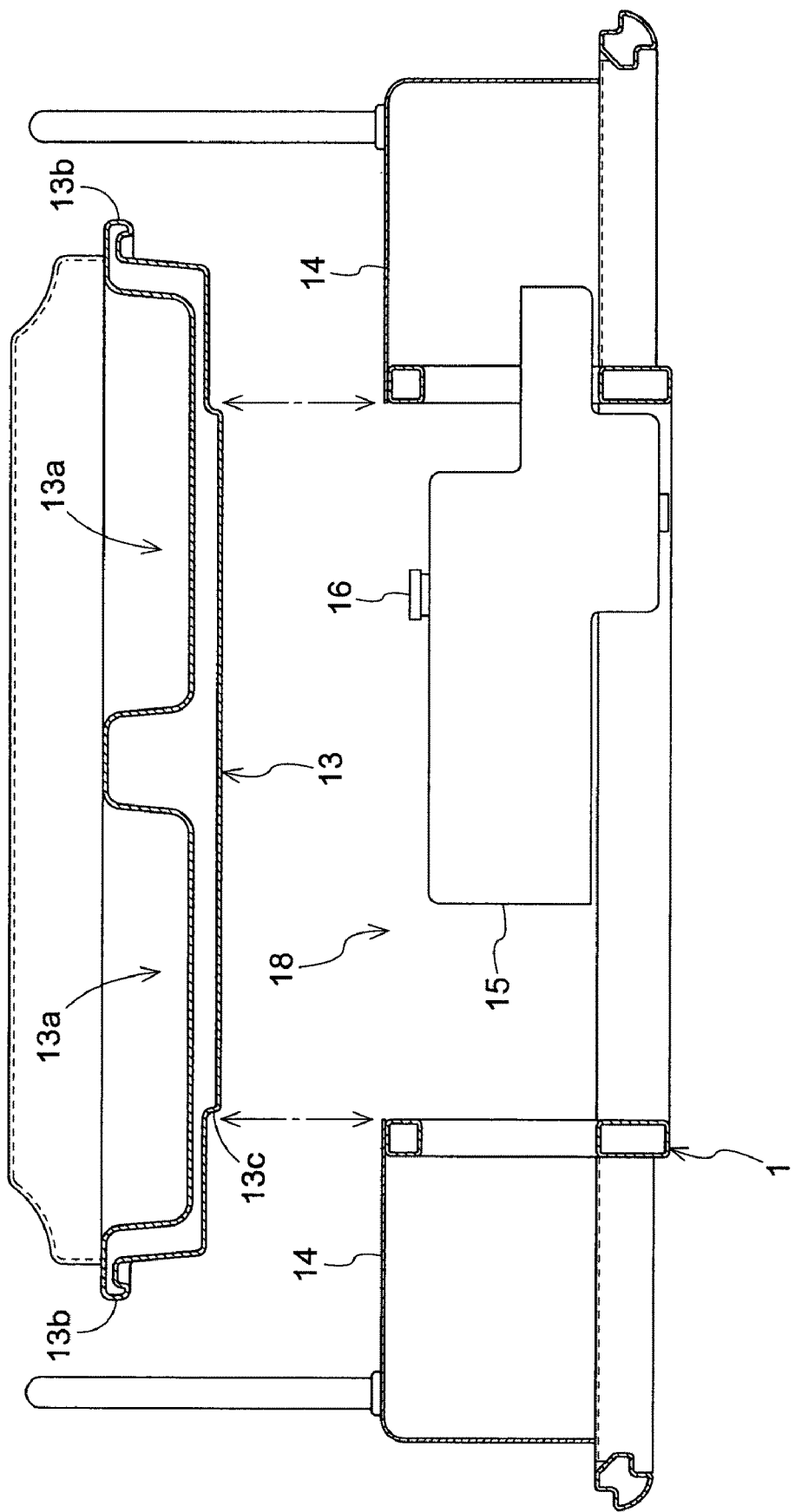
FIG. 6 is a longitudinally cut front view showing a support structure of a storage box.

A side of a multi-purpose vehicle that is an example of a work vehicle is shown in FIG. 1. In the work vehicle, independently supported left and right steerable front wheels 2 and independently supported left and right rear wheels 3 are installed on a front and rear of a vehicle body frame 1. A basic structure is provided in which a motor section 4 is disposed below a rear half part of the vehicle body frame 1; an operator's cabin 5 is provided at an intermediate position in the longitudinal direction of the vehicle body frame 1; and a loading bed 7 that is pivoted vertically about a rear support point p by a hydraulic cylinder 6 is disposed above the rear half part of the vehicle body frame 1.

In the motor section 4, an engine 9 and transmission case 10 that are directly connected in the longitudinal direction are mounted on a mounting frame 8 that is attached to and supported below the rear half part of the vehicle body frame 1 in a vibration-proof state. Motive power shifted in speed in the transmission case 10 is transmitted to the front wheels 2 and rear wheels 3, and the vehicle is driven under four-wheel drive. The motor section 4 also includes the below-described tank.

A seat support frame part 14 is built one step higher than a floor surface on a lower part of the rear of the operator's cabin 5 comprising the motor section. A two-occupant seat 11 in which a left-side operator's seat and a right-side passenger's seat are linked together is disposed above the seat support frame part 14; and a steering wheel 12, a brake pedal (not shown), and an accelerator pedal (not shown) are provided to an operator's seat side (the left side in this example) of a front part of an interior of the operator's cabin 5.

The seat 11 comprises a seat part 11a pivotably supported in a vertical direction about a support point q by a hinge 17 vertically disposed from a front part of the seat support frame part 14; and a backrest 11b anchored to a lower part of a rear wall in the cabin. A storage box 13 long in the lateral direction is provided below the seat part 11a.

The storage box 13 is made of a blow-molded resin material and has a hollow structure; wherein a left and right pair of upwardly opening storage concavities 13a is provided; integrally formed handles 13b protrude from left and right end parts; and positioning a stepped part 13c protrude from a bottom part of the storage box 13. The storage box 13 can be mounted to the upper surface of the seat support frame part 14 in a state in which the stepped part 13c is fitted into an opening 18 formed on an upper surface of the seat support frame part 14 and positioned in the longitudinal and transverse directions.

A configuration is used in which the seat part 11a is pivoted upward and moved forward and upward, whereby the storage box 13 is completely opened in the upward direction; and in which the seat part 11a lowered into a seating position is received by the storage box 13, whereby the storage box 13 is pressed and fixed in place by the seat part 11a.

When the seat 11a is pivoted upward and moved and the storage box 13 is removed, the opening 18 formed in the seating support frame part 14 is opened, and the area around the engine 9 and a hydraulic oil tank 15 of a hydraulic system of the motor section 4 are exposed. Thus, the storage box 13 is removed and the opening 18 is opened, whereby oil can be readily replenished from a pouring inlet 16 provided to an upper surface of the hydraulic oil tank 15, a belt at a front end part of the engine 9 can readily be adjusted, and other maintenance operations can readily be performed from the large opening 18.

A second embodiment shall next be described.

Figure 7:
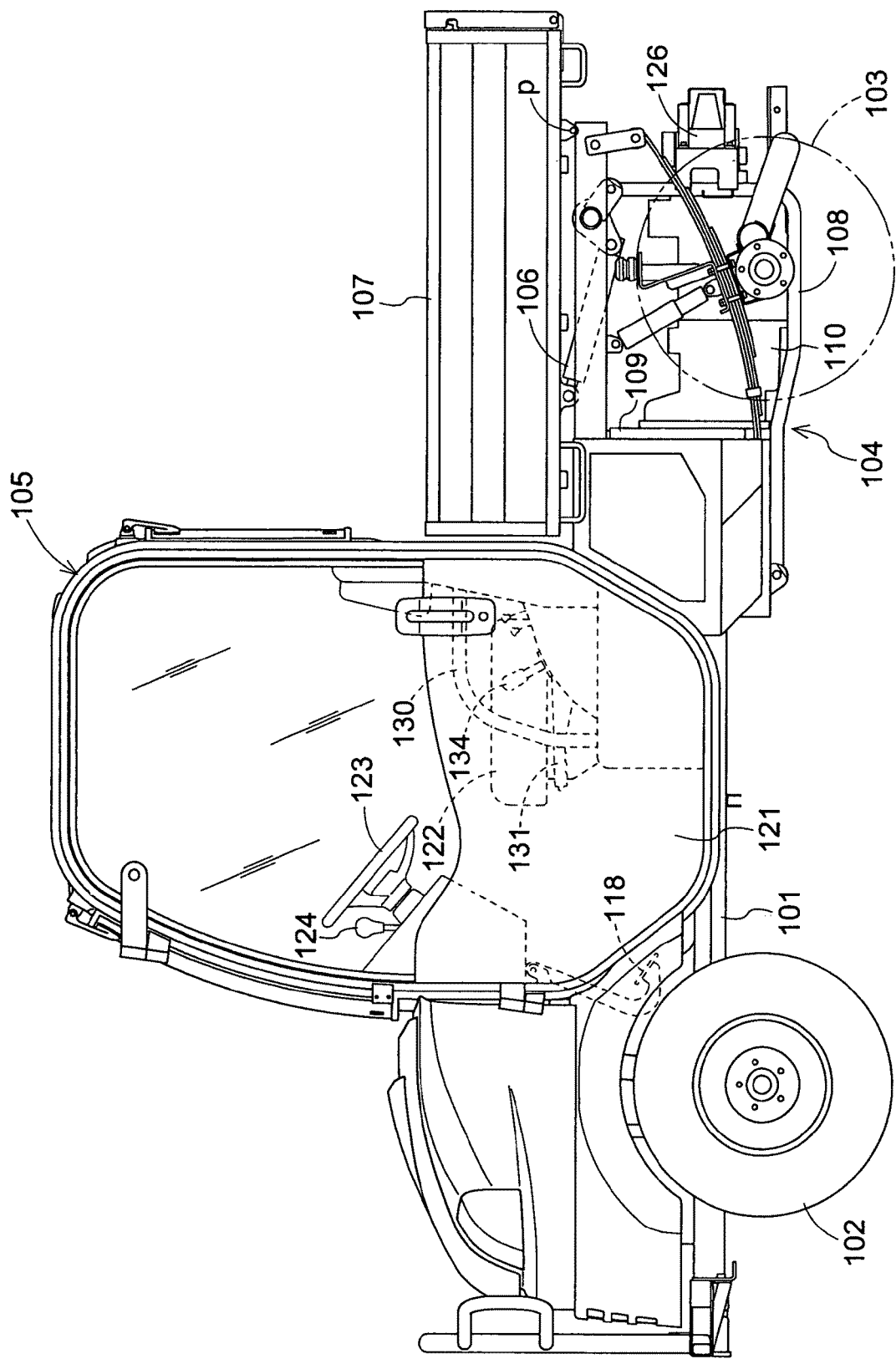
FIG. 7 is a side view of an entire body of a work vehicle according to another embodiment.
Figure 8:
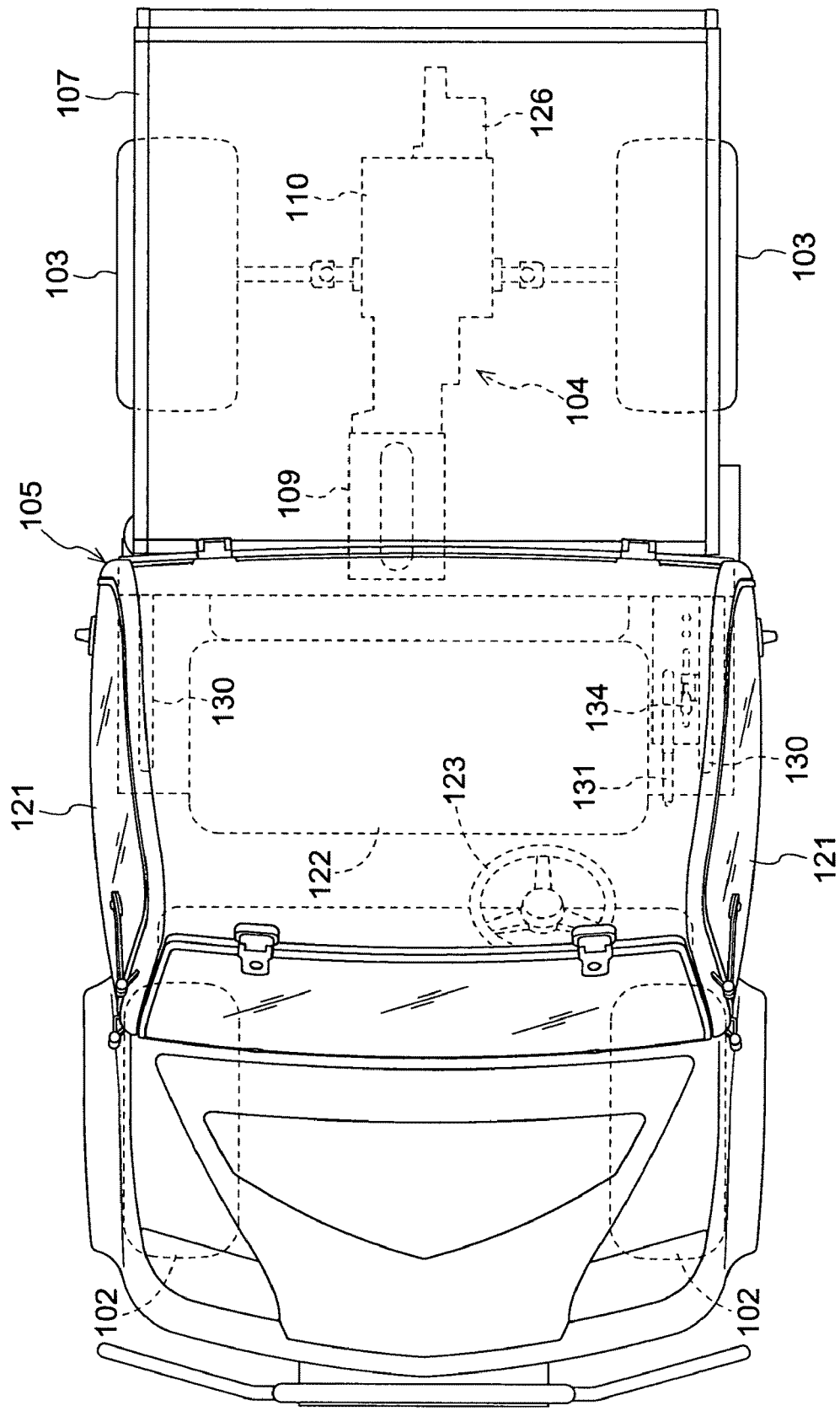
FIG. 8 is a plan view of the entire body of the work vehicle according to the other embodiment.

FIGS. 7 and 8 show a side view and a plan view, respectively, of a multipurpose work vehicle. The work vehicle has a basic structure in which independently suspended left and right steerable front wheels 102 and independently suspended left and right rear wheels 103 are installed in a front and rear of a vehicle body frame 101 formed into an uneven shape having a front half that is low and a rear half that is high; and a motor section 104 is disposed on the lower part of the rear half part of the vehicle body frame 101. An operator's cabin 105 comprising the motor section is provided at an intermediate position in the longitudinal direction of the vehicle body frame 101; and a loading bed 107 that is pivoted in the vertical direction about a rear part support point p by a hydraulic cylinder 106 is disposed on an upper part of the rear half part of the vehicle body frame 101.

Figure 9:
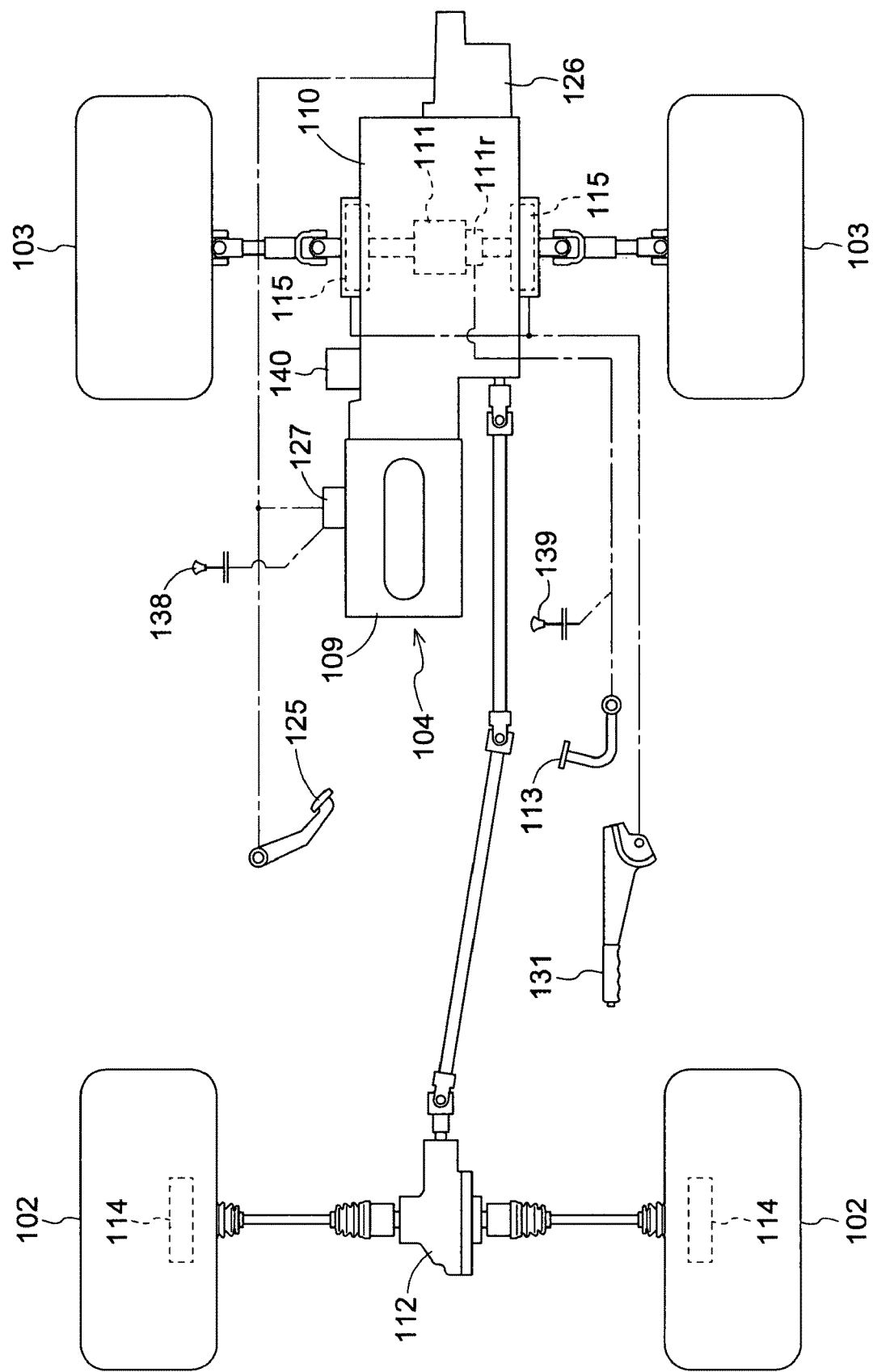
FIG. 9 is a plan view of a drive transmission system according to the other embodiment.

The motor section 104 comprises an engine 109 and a transmission case 110 that are directly connected in the longitudinal direction and mounted on a mounting frame 108 attached to and supported below the rear half part of the vehicle body frame 101 in a vibration-proof state. A motive force of the engine is shifted in speed in the transmission case 110, output to the left and right via a rear part differential gear device 111, and transmitted to the rear wheels 103; and the shifted motive force output from the transmission case 110 toward the front of the vehicle body is transmitted via a shaft to a front part differential gear device 112 and then transmitted to the left and right front wheels 102, as shown in FIG. 9.

A differential gear lock mechanism 111r is installed in the rear part differential gear device 111 and connected to a differential gear lock pedal 113 provided to a footwell inside the operator's cabin 105. The differential gear remains in a locked state only while the differential gear lock pedal 113 is being pressed down, and the left and right rear wheels 103 are driven at a constant speed.

Figure 10:
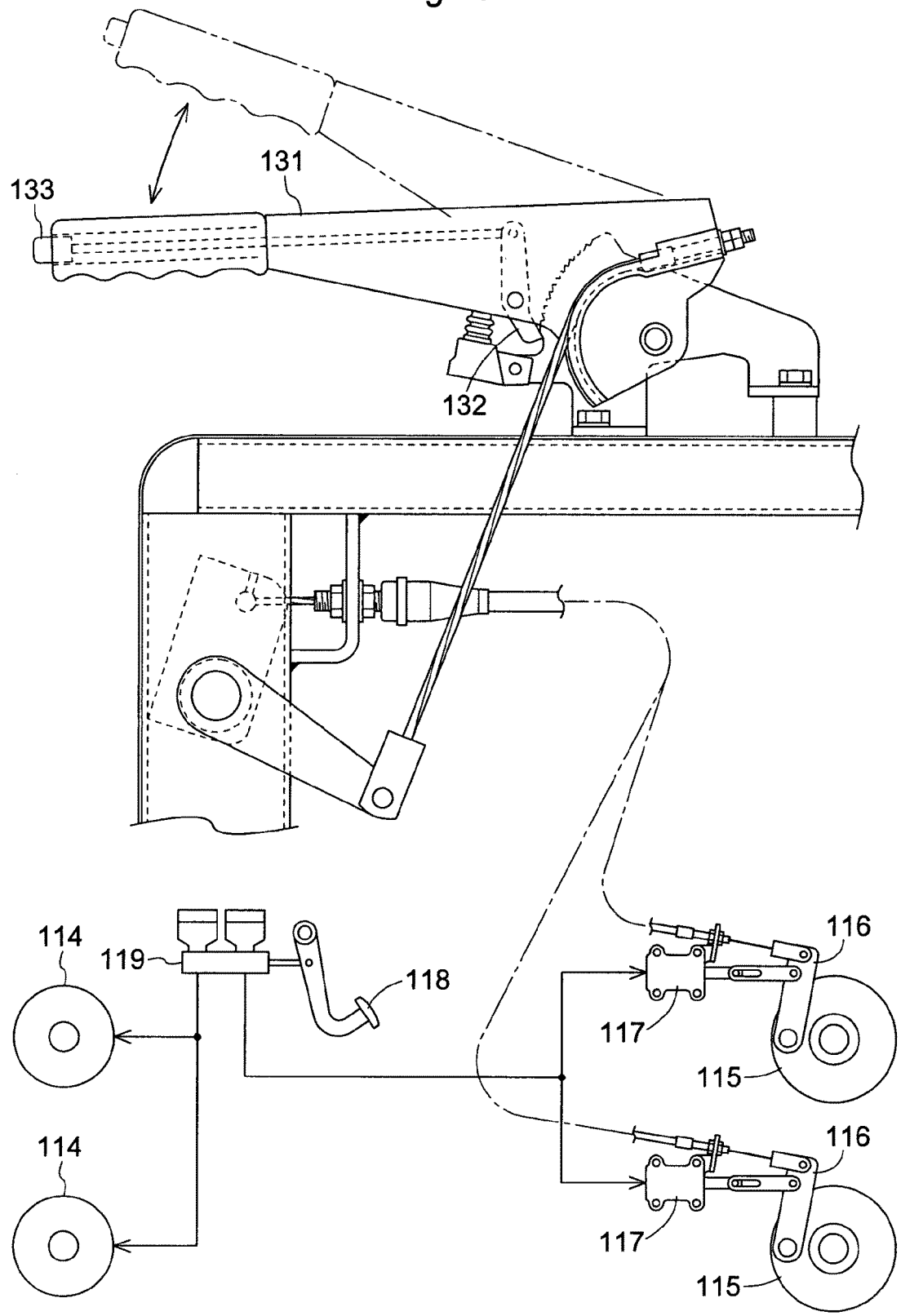
FIG. 10 is a schematic view of a brake system according to the other embodiment.

Multi-plate brakes 114, 115 are installed in a system for transmission to the front wheels 102 and a system for transmission to the rear wheels 103, respectively. The brakes 114 for the front wheels are configured so that a built-in piston (not shown) is displaced via a hydraulic operation, whereby a friction plate is brought into contact under pressure. The brakes 115 for the rear wheels are configured so that a hydraulic operating cylinder 117 causes a braking lever 116 to pivot, and a built-in cam (not shown) is rotated, whereby a friction plate is brought into contact under pressure, as shown in FIG. 10. The operating cylinder 117 and the brakes 114 for the front wheels are connected to a master cylinder 119 that is operated by a brake pedal 118 provided to the footwell inside the operator's cabin 105. The brake pedal 118 is pressed down and hydraulic pressure is output from the master cylinder 119, whereby the bakes 114 for the front wheels slow down the front wheels 102 by friction in accordance with the magnitude of the operating hydraulic pressure. The operating cylinder 117 extends and retracts and the brakes 115 for the rear wheels slow down the rear wheels 103 by friction in accordance with the magnitude of the operating hydraulic pressure. The brake pedal 118 is released, whereby the operating hydraulic pressure is eliminated, and the front and rear brakes 114, 115 are restored to a state in which no braking is applied.

Pivoting openable doors 121 are provided to the left and right of the operator's cabin 105. A seat 122 for seating two occupants in which the left side is an operator's seat and the right side is a passenger's seat is provided to a rear part of the interior of the operator's cabin 105. A steering wheel 123 and a gear-shift lever 124 are provided to a left side in front of the seat 122, and the brake pedal 118 and an accelerator pedal 125 are provided in a footwell, as shown in FIG. 11.

The accelerator pedal 125 is mechanically linked to a hydrostatic transmission (HST) 126 installed in the transmission case 110 and an accelerator 127 provided in the engine 109, as shown in FIG. 9. An acceleration operation of the hydrostatic transmission 126 and an acceleration operation of the accelerator 127 are performed in conjunction with the accelerator pedal 125 being pressed down. When pressure is removed from the accelerator pedal 125, the hydrostatic transmission 126 is returned to a zero-speed state (stopped state) and the accelerator 127 is returned to an idling rotation rate.

Figure 11:
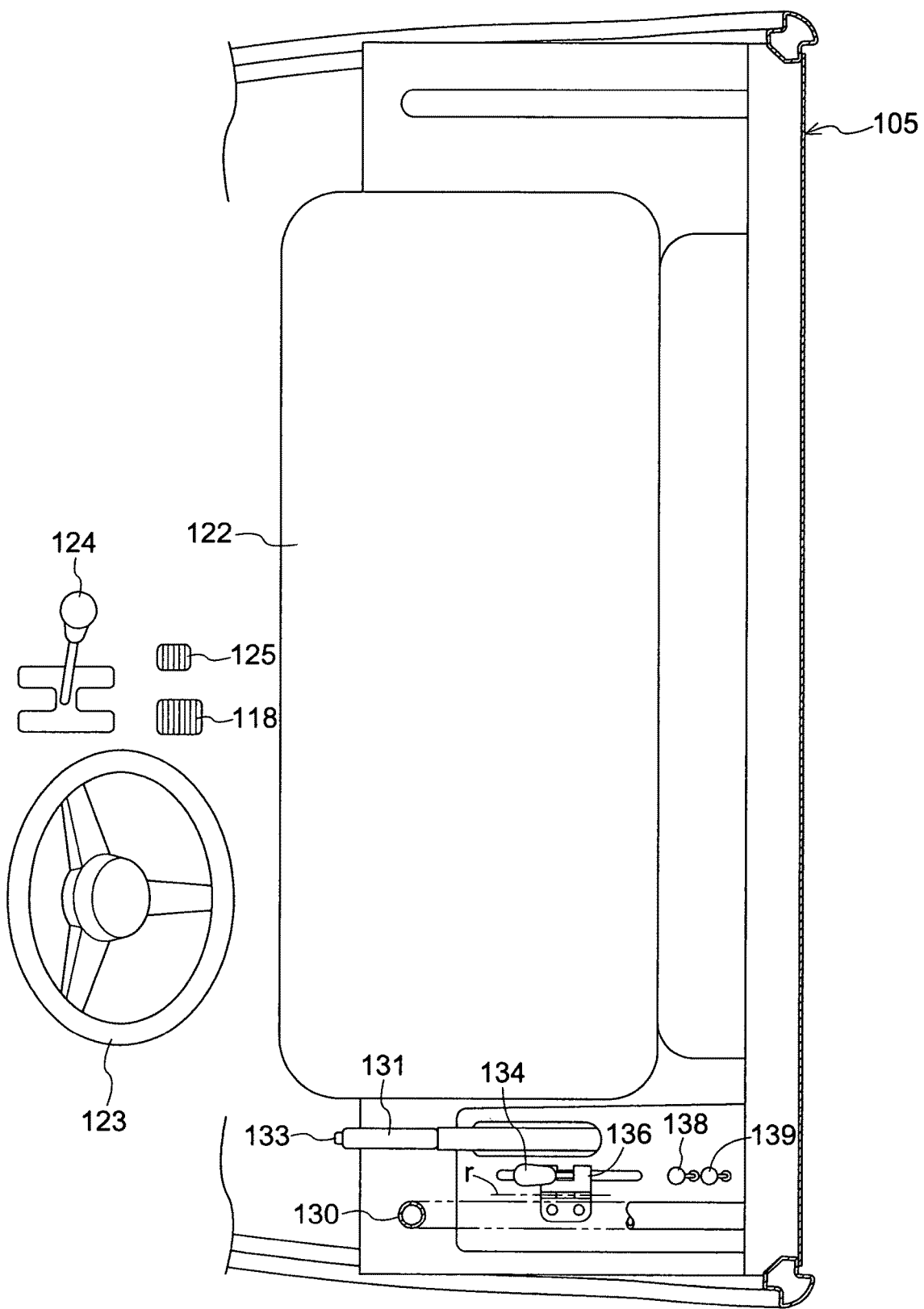
FIG. 11 is a plan view of an operator's station according to the other embodiment.
Figure 12:
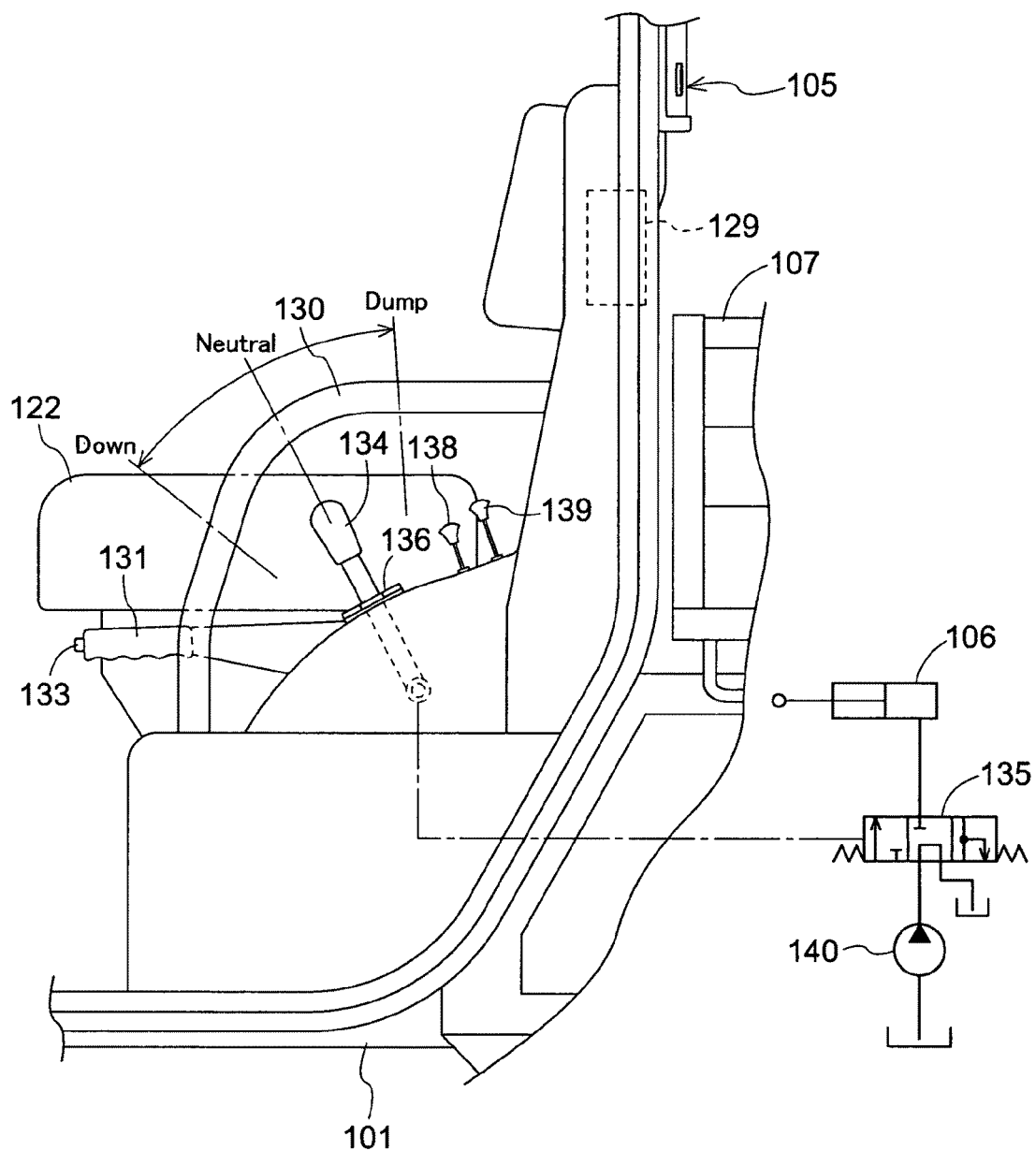
FIG. 12 is a side view showing an operation structure of a side of a seat according to the other embodiment.
Figure 13:
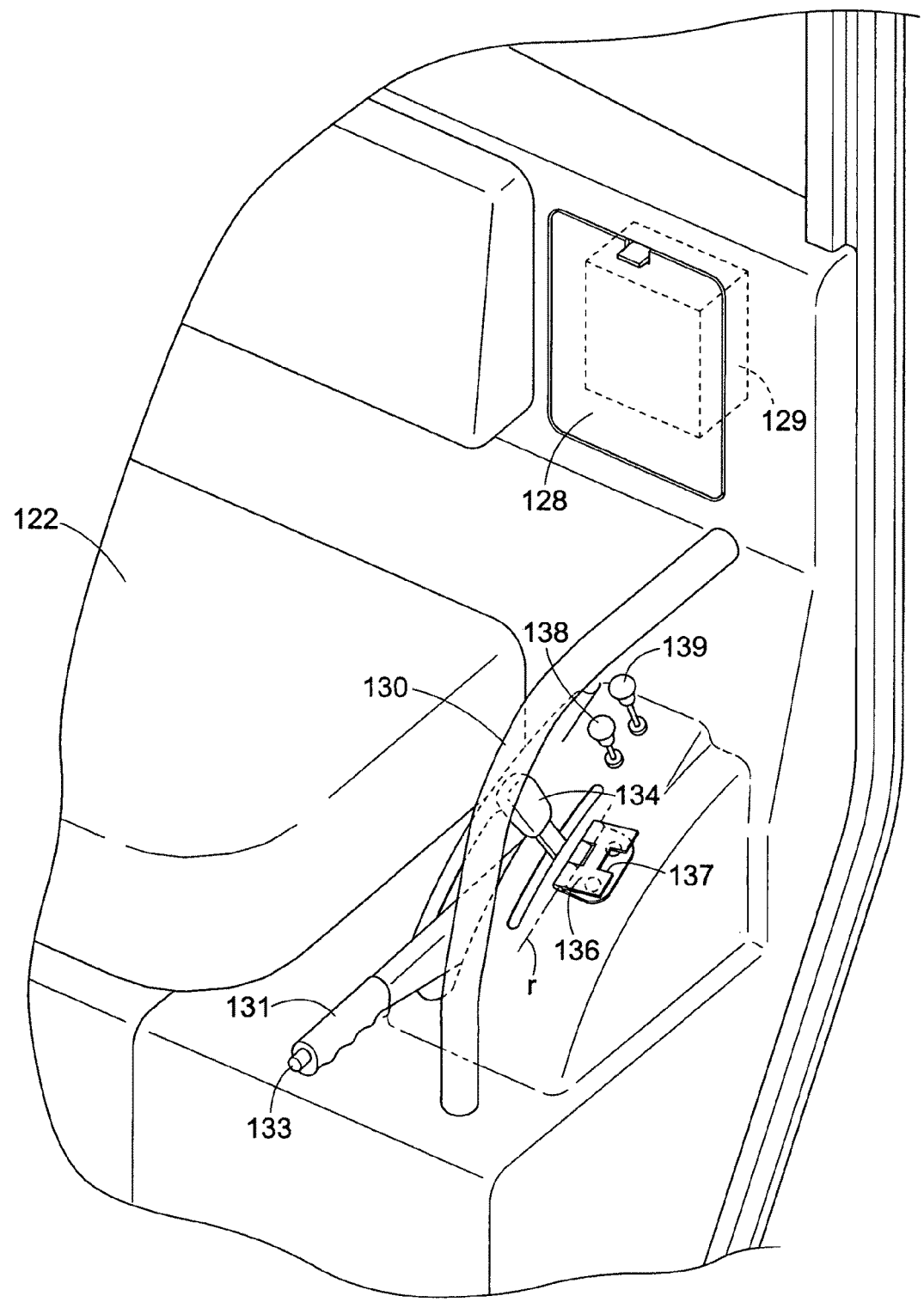
FIG. 13 is a perspective view showing the operation structure of the side of the seat according to the other embodiment.

Handles 130 composed of bent pipe members are anchored to outer sides on both the left and right sides of the seat 122, and a parking lever 131 and other operational implements are provided to the vicinity of a lower part of the handle 130 on the operator's seat side (left side of the vehicle body), as shown in FIGS. 11 to 13. A fuse box 129 covered by an openable and closable cover 128 is disposed on a rear wall part of the cabin to the rear of the operational implements in an upper part.

The parking lever 131 is disposed nearest to the seat 122, and is connected via wires to the braking operation lever 116 associated with the brakes 115 for the rear wheels, as shown in FIG. 10. The parking lever 131 is pulled upward and then locked and held by a latch pawl 132, whereby the brakes 115 for the left and right rear wheels are caused to perform a braking operation and the vehicle is parked. A release knob 133 provided to a distal end of the parking lever 131 is pressed in and the parking lever 131 is pressed down and pivoted while the latch pawl 132 is withdrawn, whereby the brake is released.

An operation lever 134 is disposed as one operational implement located on an outer side of the parking lever 131 so as not to protrude upward past the handle 130 and so as to allow pivoting in the longitudinal direction. The operation lever 134 is connected to a switching valve 135 for controlling the operation of the hydraulic cylinder 106 for the loading bed 107. The operation lever 134 is pushed rearward, whereby the hydraulic cylinder 106 is caused to extend, and the loading bed 107 is raised (dumped). The operation lever 134 is pulled forward, whereby the hydraulic cylinder 106 is caused to retract, and the loading bed 107 is returned to a lowered position. The operation lever 134 is moved to an intermediate position in the longitudinal direction, whereby the hydraulic cylinder 106 is fixed in place.

A lock member 136 composed of a metal plate member is provided to a left side of the operation lever 134 so as to be rotatable about a support point r in the longitudinal direction. The lock member 136 can be inverted and rotated between a locking position that overlaps with an operation path of the operation lever 134 and a lock release position that is a distance from the operation path in the left outward direction. The lock member 136 is disposed so as to enter into the empty space below the handle 130 when in the lock release position. The lock member 136 is switched and rotated to the locking position in a state in which the operation lever 134 has been placed at the intermediate position, whereby the operation lever 134 is fixed in a concavity 137 formed in the lock member 136, and the operation lever 134 is prevented from moving from the intermediate position in the longitudinal direction, as shown in FIG. 11.

A hand accelerator operational implement 138 and a differential gear lock operational implement 139 that are pushed and pulled in the vertical direction are disposed as other operational implements in a row along the longitudinal direction to the rear of the operation lever 134. The hand accelerator operational implement 138 and differential gear lock operational implement 139 are both configured to be pushed and pulled in the vertical direction. The rear differential gear lock operational implement 139, which is used frequently, is disposed at a higher position than the front hand accelerator operational implement 138, which is not used frequently.

The hand accelerator operational implement 138 is held by friction at a lifted position and is in contact with an accelerator operation mechanism (not shown) of the accelerator 127 in a manner that allows operation toward the direction of acceleration. The hand accelerator operational implement 138 is normally pushed down to a lowered position, at which point the accelerator 127 arbitrarily accelerates and decelerates in the above-described manner in accordance with the position of the accelerator pedal 125. When the loading bed 107 is operated, the hand accelerator operational implement 138 is pulled up and held, the engine rotation rate is kept high, and output from a hydraulic pump 140 provided in the transmission case 110 is increased.

The differential gear lock operational implement 139 is also held by friction at a raised position, and is connected to a connecting mechanism of a differential gear lock mechanism 111*r* and a differential gear lock pedal 113. The differential operational implement 139 is moved to a depressed position, at which point the differential gear is locked only while the differential gear lock pedal 113 is depressed and operates the differential gear lock mechanism 111*r*. In areas having a large number of steeply inclined slopes or a large amount of mud, the differential gear lock operational implement 139 is lifted up and held, whereby the differential gear lock mechanism 111*r* continues to lock the differential gear, and the vehicle can travel without swerving due to one of the rear wheels 103 slipping.

Alternative Embodiment (1) A configuration can be used in which the seat part 11*a* of the seat 11 is able to be removed, and the upper part of the storage box 13 is opened by removing the seat part 11*a*.

(2) The seat 11 may also be configured so that the seat part 11*a* and the back rest part 11*b* are integrally formed.

(3) A configuration can be used in which the storage box 13 is not removed, but instead is pivoted upward about a front end, and the bottom part of the cabin is opened.

(4) If the storage concavities 13*a* formed in the storage box 13 is formed to be a single long concavity in the lateral direction, long items can be accommodated, and the storage box can be conveniently utilized.

(5) The seat part 11*a* of the seat 11 can be configured so that the operator's seat and the passenger's seat are separated from one another, the separated seat parts 11*a* are opened separately to open the storage box 13 formed therebelow. In such instances, the storage box 13 may be formed into a single long box in the lateral direction as described above, or a configuration may be used in which two storage boxes 13 having a width according to the width of the seat parts 11*a* are disposed in a row in the lateral direction, and the storage boxes 13 can be opened and closed separately.

(6) A configuration can be used in which an air cleaner and a radiator for the motor section 4 are disposed below the operator's cabin 5 (operator's station). Cooling water can be replenished and a cleaner element can be replaced by opening the storage box 13.

Figure 14:
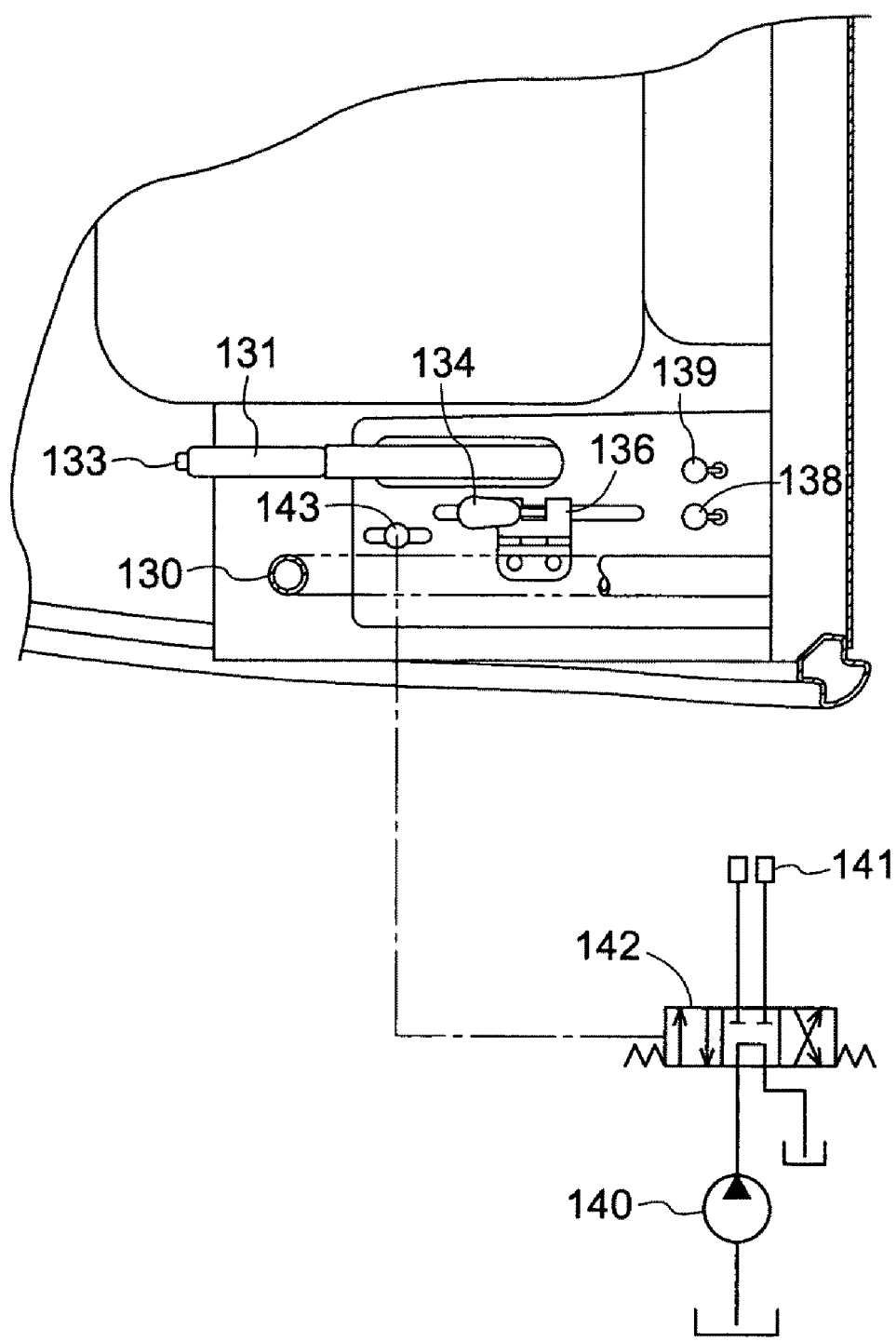
FIG. 14 is a plan view showing an operation structure of yet another embodiment.

(7) The hand accelerator operational implement 138 and differential gear lock operational implement 139 may be disposed in a row in the lateral direction to the rear of the operation lever 134, as shown in FIG. 14. Such a configuration is convenient because the differential gear operational implement 139, which is used frequently, will be positioned to the inside of the machine body, and the hand accelerator operational implement 138, which is not used frequently, will be positioned to the outside of the machine body.

(8) In machines configured so that hydraulic pressure output from the hydraulic pump 140 can be used as a working motive force (PTO motive force), a configuration may be used in which an opening and closing valve 142 is interposed between the hydraulic pump 140 and a hydraulic pressure removal port 141, and a pullout operational implement 143 for operating the opening and closing valve 142 is provided at a location to the front of the operation lever 134, as shown in FIG. 14. When the operating motive force is output and a hydraulic pressure-driven implement or the like is driven, the hand accelerator operational implement 138 is raised and held, and the output of the hydraulic pump 140 is increased.

(9) The handles 130 can be configured to have a cantilevered shape that faces forward.

(10) In the above-described examples, examples were given of machines comprising the operator's station 105 equipped with an operator's cabin. However, the present invention can also be applied to machines comprising an open-type operator's cabin 105 equipped with only a sun visor (canopy).

What is claimed is:

1. An operator's station structure for a work vehicle, comprising:
    a vehicle body frame;
    a hydraulic oil tank and an engine disposed below a rear half part of the vehicle body frame;
    a seating support frame part having an opening, the seating support frame part being disposed at an intermediate position in a longitudinal direction of the vehicle body frame;
    a seat that is disposed on the operator's station for the work vehicle comprising:
        a seat part movably supported by the seating support frame part between a first position at which the seat part covers the opening and a second position at which the seat part is positioned away from the opening; and
        a back rest part anchored to a rear wall in the operator's station; and
    a removable storage box that is configured to close the opening when disposed below the seat and above the seating support frame part, and that has an upwardly opening storage concavity accessible by moving the seat part to the second position,
    the storage concavity being located below the seat at the first position and above the seat supporting frame part, with which the seat and the seating support frame part are spaced apart from each other by a distance greater than or equal to a depth of the storage concavity;

wherein at least one of the hydraulic oil tank and the engine become accessible through the opening by moving the seat part to the second position and removing the storage box.

2. The operator's station structure of claim 1, wherein the storage box is configured to be held to a covering position by the seat part in a seating position pressing down on the storage box.

3. The operator's station structure of claim 1, wherein the storage box has a hollow structure of a blow-molded resin material.

4. The operator's station structure of claim 1, wherein the seat part of the seat is configured to seat two passengers.

5. The operator's station structure of claim 1, wherein the storage box further has a handle part disposed on both left and right end parts of the storage box.

6. The operator's station structure of claim 1, wherein the storage box has a stepped part protruding downwardly from a bottom part of the storage box, the stepped part being configured to fit within the opening and to position the storage box in longitudinal and transverse directions relative to the seating support frame part.

7. The operator's station structure of claim 1, wherein the movement of the seat between the first position and the second position is a swing movement, and a shaft of the swing movement is positioned at a height which is between a height of an upper face of the seating support frame part and a height of a lower face of the seat.

8. The operator's station structure of claim 1, wherein the seat is supported by the removable storage box in the first position spaced apart by the distance from the seating support frame part.

* * * * *

UNITED STATES PATENT AND TRADEMARK OFFICE
CERTIFICATE OF CORRECTION

| | | |
|---|---|---|
| PATENT NO. | : 7,673,920 B2 | Page 1 of 1 |
| APPLICATION NO. | : 11/726368 | |
| DATED | : March 9, 2010 | |
| INVENTOR(S) | : Nakamura et al. | |

It is certified that error appears in the above-identified patent and that said Letters Patent is hereby corrected as shown below:

Title page, Item (57) ABSTRACT, line 2, "comprising: a seat" should read -- including a seat --

Signed and Sealed this

Third Day of August, 2010

David J. Kappos
*Director of the United States Patent and Trademark Office*